(No Model.)
F. EUPHRAT.
CONDUIT FOR ELECTRIC RAILWAYS.
No. 368,576. Patented Aug. 23, 1887.
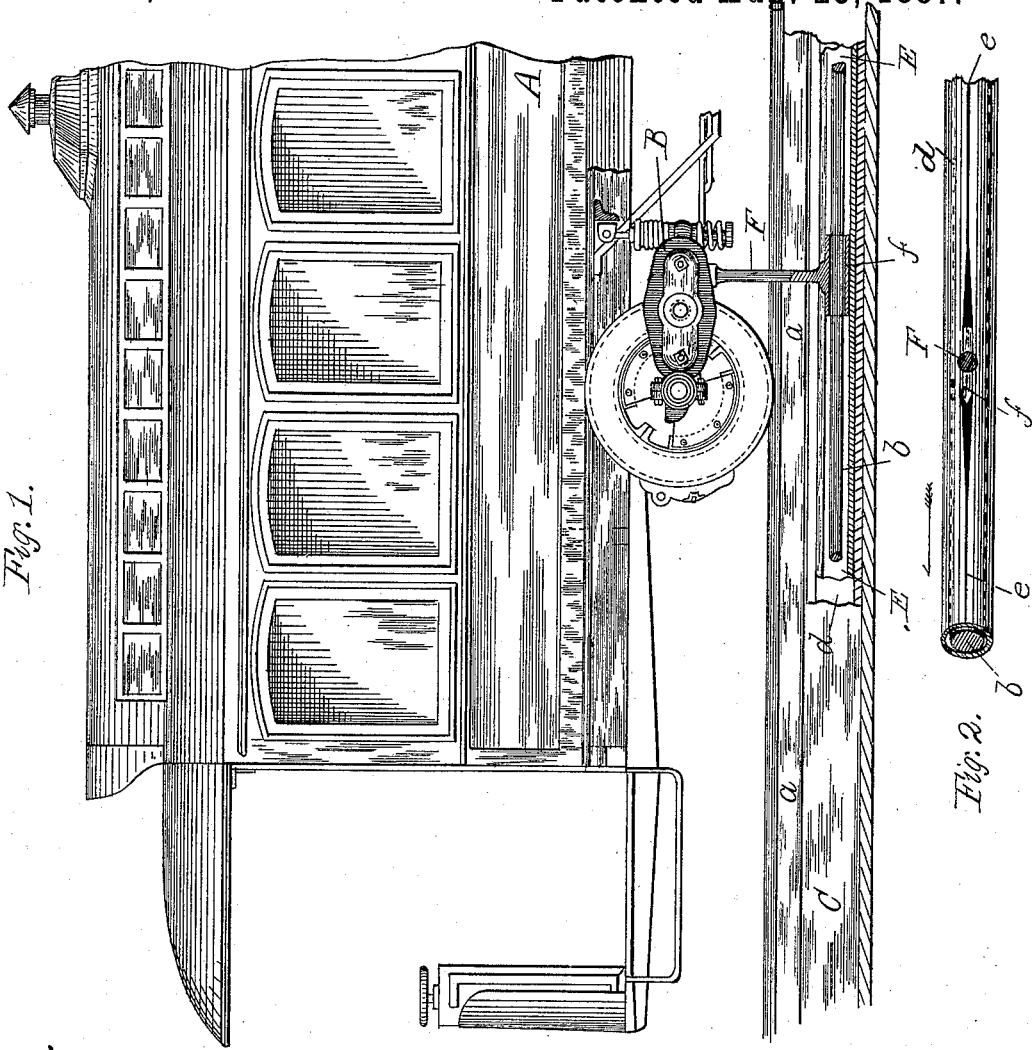
Fig. 1.
Fig. 2.
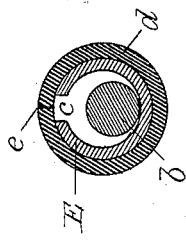
Fig. 3.
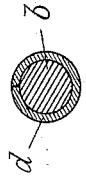
Fig. 4.
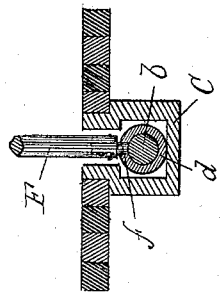
Fig. 5.
Witnesses,
H. E. Lodge
E. K. Boynton
Inventor.
Frederic Euphrat.
F. Curtis, Atty.

UNITED STATES PATENT OFFICE.

FREDERIC EUPHRAT, OF BOSTON, MASSACHUSETTS.

CONDUIT FOR ELECTRIC RAILWAYS.

SPECIFICATION forming part of Letters Patent No. 368,576, dated August 23, 1887.

Application filed May 7, 1887. Serial No. 237,391. (No model.)

*To all whom it may concern:*

Be it known that I, FREDERIC EUPHRAT, a citizen of the United States, residing at Boston, in the county of Suffolk and State of Massachusetts, have invented certain new and useful Improvements in Electric Cables or Conductors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention relates to cables or conductors which serve to convey continuous currents of electricity, particularly that class of cables by which a moving body—as an electric motor—is to be supplied.
My invention consists, primarily, in a conductor composed of a wire inclosed within a tube of insulating material, said tube having a longitudinal opening its entire length for the purpose of permitting a traveling brush or sleeve, which is to continuously contact with said wire and move easily thereupon by the opening of said tube, the yielding sides of which immediately close after passage of the brush or sleeve, and thus maintain the wire effectually insulated.

The drawings hereto annexed represent in Figure 1 a sectional elevation of my invention as applied to a street-car. Fig. 2 is a plan of the cable, showing the position of a brush or sleeve secured to it. Fig. 3 is a cross-section, and Fig. 4 is a modified form of construction, while Fig. 5 is a cross section of a conduit and cable therein.

In said drawings, A represents in elevation one end of a street-car, which is supplied with an electric motor, B, of any suitable construction.

C represents a conduit, to be made continuous and located along the line to be supplied with electricity. This conduit may be of any shape in cross-section, and is to be provided with two vertically-disposed lips, which form a longitudinal opening, *a*, extending its entire length. Within this conduit is to be laid a cable or conductor which embodies my invention, and by means of which a continuous current of electricity is to be supplied to a traveling motor.

The object of my improvement is to obviate the use of overhead lines, as well as the necessity or employment of "storage-batteries," so called, the bulk and weight of which are objectionable. Furthermore, by the use of my cable, as more fully hereinafter described, the current is supplied directly through the cable to the motor, in lieu of indirectly, as in the event of employing storage-batteries.

This cable or conductor is composed of a wire, *b*, having good conducting properties, and, as shown in Fig. 2, is to be placed preferably within a pipe, E, which prevents injury thereto, and maintains it perfectly in shape during transfer, shipment, or while it is being placed in position. This pipe is provided with a slit, *c*, running its entire length, and for purposes of insulation I have surrounded and entirely closed this pipe by a tube, *d*, composed of insulating material. This tube (illustrated in Figs. 1 and 2) is slit from end to end, as indicated at *e;* but its material is elastic, and normally holds the edges together on the line of this slit. As the sleeve or brush *f* passes along the wire *b* the arm F opens the tube *d* ahead on the line of this split *e;* but as it passes the tube *d* closes behind said arm, maintaining complete insulation of said conducting-wire.

In the application of the cable to street purposes it becomes necessary to securely and effectually protect it from injury incidental to heavy traffic in a city, and I therefore propose to lay and conceal said cable within the conduit C, before described, and which is to be located along the proposed line of travel.

In lieu of constructing the cable D within the pipe E, the latter may be omitted, in which event the wire *b* is then directly inclosed within the insulating split tube or covering *d*, (see Fig. 4,) to be subsequently located in the conduit C. To interconnect this supplying agent of electricity, the cable D, with a traveling electric motor to be attached to street-cars or otherwise, and in order to maintain continuous metallic contact between said motor and the cable, which is to be furnished with electricity from some fixed station, I have affixed to the car a downwardly-projecting arm, F, to be vertically aligned with and loosely fit in the longitudinal slit *a* in the conduit C. The lower extremity of said arm F is to be furnished with a brush or sleeve, *f*, as is deemed best, or as circumstances require. As shown in Fig. 1, said sleeve clasps the wire *b*, while the arm F extends upward through the slit *c* in the pipe E and between the separable abutting edges of the insulating-tube *d*, which snugly clasps it. (See Fig. 2.) Thus, presuming the car is moving in the direction as shown in Fig. 2, the arm F is free to pass along the line and travels in the slit *a*, constructed for it in the conduit C, while the sleeve or brush, following the movement of said car, temporarily separates the yielding insulating-tube *d*, the abutting edges of which open temporarily and again close upon passage of the car; hence direct metallic contact is continuously maintained between the motor and the cable, and the current of electricity passing over the latter is conveyed to the motor in the most direct and efficient manner. Furthermore, this cable is kept insulated, and thereby embodies the advantages of conductors which are surrounded by the usual entire and non-separable form of insulating device.

By the employment of this peculiarly-constructed cable, one which is insulated, and therefore adapted to be laid underground, several advantages are obtained, prominent among which is direct electric communication constantly from the generator to the motor, absence of poles which are required in overhead lines, and, furthermore, in the ease by which an electric current can be obtained for lighting the car to which the motor is applied. Communication from any car to a central station can also readily be established.

I claim—

1. A conducting-wire, in combination with an elastic tube inclosing said wire and split longitudinally, as described, and an attachment of a traveling motor, which enters said sleeve through said slit and makes electrical contact with said wire, the tube closing behind it, substantially as set forth.

2. The combination, with a conduit, B, having a longitudinal opening, *a*, as specified, of an insulated cable, D, composed of a central conducting-wire, *b*, a protecting-pipe, E, longitudinally opened at *c*, and the insulating-tube *d*, normally closed, but separable its entire length, all operating substantially as herein described.

3. In a system for supplying a continuous current of electricity to a traveling motor, the combination, with the conduit C, the motor B, and arm F, with its connecting sleeve or brush, of the cable D, provided with an insulating-tube, *d*, separable longitudinally by said arm, and consisting of elastic material, in order that it may close automatically behind said arm, as and for the purposes stated.

In testimony whereof I affix my signature in presence of two witnesses.

FREDERIC EUPHRAT.

Witnesses:
C. H. GAY,
H. E. LODGE.